(12) United States Patent
Tamir et al.

(10) Patent No.: US 11,997,206 B2
(45) Date of Patent: May 28, 2024

(54) TECHNIQUES FOR PROTECTING WEB-ACCESS

(71) Applicant: RADWARE. LTD, Tel Aviv (IL)

(72) Inventors: Alon Tamir, Kiryat Ono (IL); Amir Marmor, Arugot (IL); David Aviv, Tel Aviv (IL)

(73) Assignee: RADWARE, LTD., Tel Aviv (IL)

( * ) Notice: Subject to any disclaimer, the term of this patent is extended or adjusted under 35 U.S.C. 154(b) by 322 days.

(21) Appl. No.: 17/481,923

(22) Filed: Sep. 22, 2021

(65) Prior Publication Data

US 2023/0091851 A1    Mar. 23, 2023

(51) Int. Cl.
*H04L 29/06* (2006.01)
*H04L 9/00* (2022.01)
*H04L 9/08* (2006.01)
*H04L 9/30* (2006.01)
*H04L 9/32* (2006.01)
*H04L 9/40* (2022.01)

(52) U.S. Cl.
CPC ............ *H04L 9/3213* (2013.01); *H04L 9/006* (2013.01); *H04L 9/0838* (2013.01); *H04L 9/0869* (2013.01); *H04L 9/30* (2013.01); *H04L 9/3239* (2013.01); *H04L 63/20* (2013.01); *H04L 9/50* (2022.05)

(58) Field of Classification Search
CPC ..... H04L 9/3213; H04L 9/006; H04L 9/0838; H04L 9/0869; H04L 9/30; H04L 9/3239; H04L 63/20; H04L 9/50; H04L 9/0866; H04L 9/3226; H04L 9/0825
See application file for complete search history.

(56) References Cited

U.S. PATENT DOCUMENTS

| | | |
|---|---|---|
| 8,671,058 B1 | 3/2014 | Isaacs |
| 8,752,157 B2 | 6/2014 | Radhakrishnan |
| 9,424,414 B1 | 8/2016 | Demirjian et al. |
| 9,723,005 B1 | 8/2017 | McInerny et al. |
| 10,282,557 B1 | 5/2019 | Pore et al. |
| 11,019,059 B2 | 5/2021 | Lelcuk et al. |
| 11,102,190 B2 | 8/2021 | Lelcuk et al. |

(Continued)

FOREIGN PATENT DOCUMENTS

| | | |
|---|---|---|
| CN | 107563846 A | 1/2018 |
| DE | 102017117598 A1 | 2/2019 |

OTHER PUBLICATIONS

Yin, et. all. BOTNET Detection Based on Correlation of Malicious Behaviors, 2013.

(Continued)

*Primary Examiner* — Mahfuzur Rahman
(74) *Attorney, Agent, or Firm* — M&B IP Analysts, LLC (57) ABSTRACT

A system and method for identity-based access admission are provided. The method includes generating in a browser of a client device a unique identity key for the browser, wherein the identity key is generated in an internal frame (iFrame) thread, is executed in a main thread of the browser, and wherein the identity key includes a fingerprint characterizing in part the browser and the client device, an internet protocol address of the client device, and a public-encryption key; and registering the identity key with an admission controller, wherein access to a protected entity by the client device is enforced using the identity key.

19 Claims, 5 Drawing Sheets

(56) References Cited

U.S. PATENT DOCUMENTS

| | | |
|---|---|---|
| 11,195,177 B1 | 12/2021 | Vijayvergia |
| 2006/0156385 A1 | 7/2006 | Chiviendacz et al. |
| 2010/0017890 A1 | 1/2010 | Tucker et al. |
| 2010/0037147 A1 | 2/2010 | Champion et al. |
| 2010/0318669 A1 | 12/2010 | Chugh |
| 2011/0113147 A1 | 5/2011 | Poluri et al. |
| 2011/0231913 A1 | 9/2011 | Feng et al. |
| 2012/0023554 A1 | 1/2012 | Murgia et al. |
| 2013/0347067 A1 | 12/2013 | Li et al. |
| 2015/0128236 A1 | 5/2015 | Moscicki et al. |
| 2015/0222604 A1* | 8/2015 | Ylonen ................ H04L 9/3263 713/171 |
| 2015/0363769 A1 | 12/2015 | Ronca et al. |
| 2016/0048662 A1 | 2/2016 | Arnoud et al. |
| 2016/0188850 A1 | 6/2016 | Limbasia et al. |
| 2016/0224803 A1 | 8/2016 | Frank et al. |
| 2016/0328545 A1 | 11/2016 | Chan et al. |
| 2016/0359904 A1 | 12/2016 | Ezra et al. |
| 2017/0070534 A1 | 3/2017 | Bailey et al. |
| 2017/0244709 A1 | 8/2017 | Jhingran et al. |
| 2017/0331802 A1* | 11/2017 | Keshava ................ H04L 9/0894 |
| 2018/0041336 A1* | 2/2018 | Keshava ................ H04L 9/0891 |
| 2018/0159881 A1 | 6/2018 | Crabtree et al. |
| 2018/0225469 A1 | 8/2018 | Daniel et al. |
| 2018/0280802 A1 | 10/2018 | Stroud |
| 2019/0205512 A1 | 7/2019 | Franco |
| 2019/0299105 A1 | 10/2019 | Knight et al. |
| 2019/0305968 A1 | 10/2019 | Versteeg et al. |
| 2019/0306235 A1 | 10/2019 | Veale et al. |
| 2020/0366671 A1* | 11/2020 | Larson ................. H04L 9/3228 |
| 2021/0243188 A1 | 8/2021 | Grocutt |
| 2022/0272084 A1* | 8/2022 | Hyatt .................... H04W 12/40 |
| 2023/0091851 A1* | 3/2023 | Tamir ..................... H04L 9/006 713/159 |

OTHER PUBLICATIONS

First Foreign Office Action for European Patent Application No. 19730655.8 dated Jan. 13, 2022, EPO, Munich, Germany.

First Foreign Office Action for European Patent Application No. 19730658.2 dated Jan. 13, 2022, EPO, Munich, Germany.

First Office Action for app # CN 201980041504.9, dated Mar. 7, 2024. The State Intellectual Property Office of People's Republic of China, Bejing, China.

First Office Action for App No. CN 201980042983.6, dated Mar. 12, 2024. The State Intellectual Property Office of People's Republic of China.

* cited by examiner

TECHNIQUES FOR PROTECTING WEB-ACCESS

TECHNICAL FIELD

This disclosure generally relates to network security technology, and more particularly to protection of web-access using identity-based and blockchain-based techniques.

BACKGROUND

A bot is a software application that is configured to execute automated tasks, often over large networks such as the Internet. Bots can be used to perform helpful functions but are often employed for more nefarious purposes. Botnets are collections of coordinated bots that run over one or more systems and can be programmed to execute harmful codes. Because botnets are often implemented using infected home computers or Internet of Things (IoT) devices with random IP addresses, or virtual machines which can regularly change certain identifying characteristics such as MAC addresses or Internet Protocol (IP) addresses, it can be difficult to identify, track, and block attacks initiated by such botnets. Botnets can share an attacked system with legitimate users such that their presence is effectively hidden.

Advanced botnets utilize machine learning techniques to better coordinate the attack. Such machine learning techniques are used to alleviate the Command and Control (C&C) burden, optimize the attack, and circumnavigate counter measures. One common technique used is based on Swarm intelligence allowing for self-organization of botnets.

Bots against web applications or websites can attack account credentials, availability of inventory, abuse of functionality (other), payment cardholder data, vulnerability identification, and Denial of Service (DoS). The nature and operation of threats in each such category is different and should be handled differently. For example, in the "Availability of Inventory" category, threats related to Denial of Inventory, Scalping, and Sniping are executed. On the other hand, threats in the "Vulnerability Identification" category include vulnerability scanning, foot-printing, and finger-printing. As such, different detection and mitigation techniques should be utilized for different types of detected threats.

Existing anti-bot solutions use a simple "human or machine" test to establish trust and security context, i.e., a human is trusted but not machines. Current solutions utilize interactive challenges to verify if a transaction is initiated by a legitimate client application (e.g., a web browser) and is under control of a human. Examples for such challenges are a SYN cookie, a web redirect (e.g., 302 HTTP redirect message), a JavaScript challenge, a CAPTCHA, and the like, used individually or orchestrated to a single flow.

Establishing security context and trust based on web challenges suffers from several limitations. For example, such challenges require an interactive session with a client device. Further, for at least a CAPTCHA challenge, a graphical user interface (GUI) is also required. As such, the challenges negatively affect the user experience while accessing the web services. In addition, challenges that require a GUI cannot operate to allow machine-to-machine authentication, such as through Application Programming Interfaces (APIs). This is a major disadvantage since many of today's legitimate clients, such as IoT devices, are not equipped with suitable GUIs. Further, CAPTCHAs can be bypassed using "sweatshops."

Further, in the related art, existing anti-bot solutions rely on tracking user activities and devices using "fingerprinting" techniques to monitor and identify bot activity. A fingerprint of a computing device is information collected about the device (e.g., a smartphone) for identification. Fingerprints can be used to identify individual users or devices even fully or partially when cookies are turned off. Tracking user activity includes collecting behavioral data over time.

Generating a unique fingerprint for a large number of devices requires the fingerprints to be very sensitive to variations in the collected data, as such fingerprints become less stable over time and, as a result, a device may not exhibit the same fingerprint over time. This adversely affects the value of the collected data. Fingerprinting techniques are also susceptible to spoofing. A bot may actively modify its fingerprint to alter its historical data or to identify its data as that of another device. Further, anti-bot solutions impose componential penalties when validating fingerprints.

Furthermore, existing anti-bot solutions attempt to cross-correlate the data with device or personal information such as, for example, a username, phone number, login credentials, and so on. As such, existing anti-bot solutions breach the privacy of users, and thus may not be effective due to privacy regulations. For example, general data protection regulation (GDPR) prohibits sharing devices' fingerprints across sites.

Therefore, it would be advantageous to provide an efficient solution that would cure the deficiencies of existing anti-bot solutions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for identity-based access admission. The method comprises generating in a browser of a client device a unique identity key for the browser, wherein the identity key is generated in an internal frame (iFrame) thread, is executed in a main thread of the browser, and wherein the identity key includes a fingerprint characterizing in part the browser and the client device, an internet protocol address of the client device, and a public-encryption key; and registering the identity key with an admission controller, wherein access to a protected entity by the client device is enforced using the identity key.

Certain embodiments disclosed herein also include a system for identity-base access admission. The system comprises a processing circuitry; and a memory, the memory containing instructions that, when executed by the processing circuitry, configure the system to: generate in a browser of a client device a unique identity key for the browser, wherein the identity key is generated in an internal frame (iFrame) thread, is executed in a main thread of the browser, and wherein the identity key includes a fingerprint characterizing in part the browser and the client device, an internet protocol address of the client device, and a public-encryption key; and register the identity key with an admission controller, wherein access to a protected entity by the client device is enforced using the identity key.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, techniques for protecting web applications and web access are provided. The disclosed embodiments can be integrated with blockchain-based access techniques to further secure web sources. The disclosed embodiments replace existing trust-based and web challenge techniques. In addition, the disclosed embodiments provide a complete private access solution to web sources where no personal information on the user is required. The disclosed embodiments further improve the user experience as the user is not required to solve CAPTCHA or go through a tedious authentication process.

The disclosed techniques are based on generating an identity key from a browser attempting to access a protected entity (e.g., web resource). The identity key may be structured to include, for example, an IP address of a device accessing the protected entity, a unique identifier, and a fingerprint. The generated identity key is utilized to authorize access to the protected entity as any attempt to modify or tamper with the identity key would prevent access to the protected entity.

In a further embodiment, the generated identity key is utilized to register a client device on a blockchain network to further allow authentication using blockchain-based access techniques.

The disclosed techniques improve the security of protected entities including, but not limited to, web resources using the identity keys. The generated key can be utilized to uniquely track a client accessing a protected entity. Further, the identity key can provide a unique identifier to record the user on a blockchain network to enable blockchain access control techniques. Such techniques provide efficient protection against bots attempting to execute attacks, such as but not limited to, account credentials, availability of inventory, abuse of functionality (other), payment cardholder data, vulnerability identification, and Denial of Service (DoS). The disclosed techniques further allow to reduce the time to access the protected entity in comparison to existing bot protection techniques.

Figure 1:
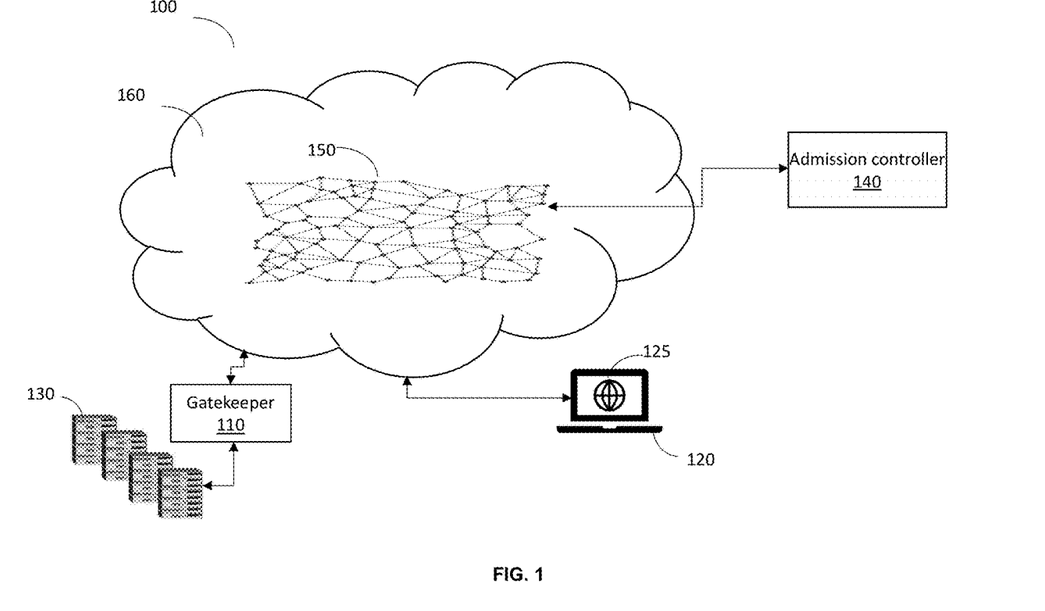
FIG. 1 is a network diagram utilized to describe the various disclosed embodiments.

FIG. 1 shows an example network diagram 100 utilized to describe the various disclosed embodiments. The network diagram 100 illustrated in FIG. 1 includes a gatekeeper 110, a client device 120, a protected entity 130, and an admission controller 140.

In an embodiment, the blockchain-based access control are realized by the admission controller 140. To this end, the admission controller 140 is configured to register the client 120 on the blockchain peer-to-peer network 150 (hereinafter referred to as the blockchain network 150, merely for simplicity purposes), and transact blockchain transactions over the blockchain network 150. The entities in the network diagram 100 communicate via a network 160, reside in the network 160, or both.

The blockchain network 150 is a collection of one or more nodes (not labeled) utilized to maintain a decentralized ledger and verified blocks, as discussed above. A node may be a physical machine, or a virtual machine executed by a machine having a sufficient computing power to verify a block. In an embodiment, the nodes of the blockchain network 150 may be configured to handle proprietary access tokens (e.g., verified block of transactions for converting proprietary tokens). The proprietary access tokens may be of different types.

In another embodiment, the nodes of the blockchain network 150 may be configured to handle tokens of standard virtual currencies such as, but not limited to, Bitcoin, Ethereum®, Litecoin, and the like. For example, the infrastructure to the Ethereum® blockchain network is based on a collection of nodes realized as Ethereum Virtual Machines (EVM) connected in a mesh connection. Each such node runs a copy of the entire blockchain and competes to mine the next block or validate a transaction. In an embodiment, the blockchain network 150 can be configured as a private network. In this embodiment, access tokens (or contracts) accessible to nodes that are connected to the blockchain network 150 operate in a private mode. In yet another embodiment, a private token is utilized as part of a public or private Ethereum blockchain.

The client device (or simply client) 120 may be a PC, a mobile phone, a smart phone, a tablet computer, a server, or any compute device, and the like. The client 120 may be operated by a legitimate user or a legitimate program, or may be an attack tool. The client 120 may execute an application or program to access the protected entity 130.

The protected entity 130 is the entity to be protected from malicious threats. The protected entity 130 may be any network or computing element including resources that can be accessed by the client 120. For example, the protected entity 130 may be a function in a serverless architecture, an application server, a web server, a cloud application, a datacenter, a network device (e.g., a router, an ADC, etc.), a firewall (e.g., a web-application firewall), and so on. In an embodiment, the protected entity 130 may be a virtual or a physical entity. In some embodiments, the disclosed embodiments are utilized to protect websites, web applications, and the like executed or hosted by the entity 130.

The gatekeeper 110 may be configured to perform the authorization process on behalf of the protected entity 130. To this end, the gatekeeper 110 is configured to enforce access policy determined by the admission access controller 140. The policy may, for example, define the expected key from a client based on its IP. The gatekeeper 110 may be further configured to receive a signal from the admission controller 140 authorizing an access to the protected entity 130. Such signals may be triggered in response to the successful completion of blockchain based access techniques by the client 120.

The gatekeeper 110 may be deployed as a proxy to the protected entity 130 (as illustrated in FIG. 1) or as an out-of-path device. The gatekeeper 110, in an embodiment, may be realized as a virtual or physical device, such as a network device or other type of computing device. Examples for such a network device include an application delivery controller (ADC), a load balancer, a web application firewall (WAF), a router, a firewall, and the like. The gatekeeper 110 may be realized as a service, such as, but not limited to, a cloud service, a service executed by the protected entity 130, and the like.

In an embodiment, the gatekeeper 110 may be configured to provision the protected entity with new access policies or modified access policies. The access policies define the requirements that must be fulfilled in order to access the protected entity, for example, by the client. Such policies are determined by the admission controller 140.

According to the disclosed embodiments, the admission controller 140 is configured to orchestrate the generation of the identity key for the client 120. To this end, upon an attempt to access the protect entity 130, the client 120 is directed by the gatekeeper 110 to downloaded script code (or agent) from the admission controller 140. The script code, when executed by the client 120, causes the initiation of an identity engine responsible for generating the identity key. As will be discussed below, with reference to FIG. 3, the identity engine is executed in an internal frame (iFrame) thread within a web browser 120.

In some embodiments, the admission controller 140 is further configured to orchestrate blockchain-based admission control process to authorize an access to the protected entity. In an example embodiment, the blockchain-based admission control process is based on games or token-based authorization.

A game is used to control access to protected entities. Specifically, a game is a mechanism by which a bias is established and henceforth access to rights and privileges are gained, exchanged, or otherwise used. The game, when executed, can also reveal the behavior of the client (or its user). A bias may be defined as metadata utilized for cyber-security assessments. Different types of biases are defined herein. Such types include, but are not limited to, a cognitive bias, a behavior bias, and an intent bias. The various types of biases are determined using different types of games executed by a client attempting to access a protected entity.

The game's type, scope, and available strategies are set in an access policy defined for the protected entity. A bias is determined based on the results of the game. Based on the bias, a determination can be made if a client accessing a protected entity is, for example, a bot. That is, drift or deviation from the expected or previously established bias would be indicative of a bot. The admission control based on games are discussed in greater detail in U.S. patent application Ser. No. 16/384,179 assigned to the common assignee and is hereby incorporated by reference.

In yet another embodiment, the blockchain-based admission control process is based on token utilization. In such an embodiment, access tokens of a first-type are granted to the client 120 and a conversion transaction identifying a request to convert the first-type of access tokens with access tokens of a second-type is searched for in the blockchain network 150. Such a transaction designates at least the protected entity 130. Then, a conversion value for converting the first-type of access tokens into the second-type of access tokens is determined based on at least one access parameter.

For example, to grant an access to the protected entity, a first sum of the first-type of access tokens are converted into a second sum of the second-type of access-based tokens, and access is granted when the sum of the second-type of access tokens is received as a payment from the protected entity. Various techniques for the admission control implementing access tokens utilization are further discussed in U.S. patent Ser. No. 11/019,059 assigned to the common assignee and is hereby incorporated by reference.

The blockchain-based admission control may be organized or orchestrated by the elements of the admission controller 140. In an example embodiment, the admission controller 140 is utilized to record or log any transactions performed between the client 120 and the protected entity 130. For example, the admission controller 140 is configured to record any suspicious user or bot activities (e.g., many access attempts by a client, a high rate for utilizing access tokens, and so on). In another embodiment, the function of logging transactions by the admission controller 140 is performed on the blockchain network 150, i.e., using a distributed ledger maintained thereon.

The admission controller 140 may relate to the protected entity 130, where both the admission controller 140 and the protected entity 130 are peers in the blockchain network 150 and each may act as a proxy to the blockchain network 150. For example, acting as a proxy may include translating from HTTPS messages to messages that can be transported on the network 150. Each of the admission controller 140 and the protected entity 130 may be configured to receive or otherwise intercept requests (such as, but not limited to, HTTP/HTTPS requests) generated by the client 120.

According to the disclosed embodiments, the admission controller 140 receives the generated identity key (for each client) and creates a blockchain access account for the client. The blockchain access account allows to assign and withdraw access tokens based on games and/or conversion rate. The identity key is the identity of the client 120 in the blockchain network 150. The admission controller 140 may be further configured to administer the games that the client 120 needs to participate in order to gain access to the protected entity 130 or to specific resources (not shown) within the protected entity 130. The admission controller 140 may also replace one type of access token with another type of access token based on a predefined or computed conversion rate.

According to an embodiment, the admission controller 140 may further generate baselines based on the identity keys (generated for multiple clients) and based on the baselines defined by access policies. In an embodiment, the baselines generated by the admission controller 140 may include a number of public-encryption keys, keys per fingerprint, a number of fingerprints per IP address, combinations of fingerprints and public-encryption keys, and so on. It should be noted that the PKI key is a public key.

Using the learned baselines one or more access policies can be determined by the admission controller 140. The access policies may include, for example, deny and request from an IP address that does not have a declaration of a correct combination between a fingerprint and a public-encryption key.

In certain embodiments, access to a protect entity 130 may be granted only based on the identity key. To allow access, to the protected entity 130, a request generated by the browser 125 should include the key. For example, a header of the HTTP request must include all elements of the identity key: an IP address of the device, a public-encryption key with a validation signature, and a fingerprint. If any of these elements does not match the attributes defined in the access policy for the device, access is denied. The validation signature is created by signing the identity key with private-encryption key. The created signature is attached to each message sent with the identifier key to validate that the private-encryption key was used.

It should be appreciated that the identity key can be utilized to block or mitigate potential cyber-attacks, such as, an account takeover attack, web scraping attacks, phishing attacks, and the like. For example, an attacker attempting to access the protect entity would be blocked by the gatekeeper 110 or the protected entity 130, as the attacker does not possess the identity key or if any element of the key does not match the key registered by the admission controller 140 and defined in a respective access policy. For example, an attack tool operating for the same device would typically change the IP address of the source of the requests. Thus, if a request is received from an IP address with a fingerprint that was not associated with the address, the request is blocked.

The identity key is generated by the client 120, and specifically by a browser 125 executed by the client 120. The browser 125 may be any type of web browser or application (app) executed over the client 120 and capable of at least processing script code, HTML code, and the like. As will be discussed below, the identity key is generated in an initial Frame (iFrame) thread executed in the browser 125. The iFrame may access a server operating at a domain different than the domain of the protected entity.

Figure 5:
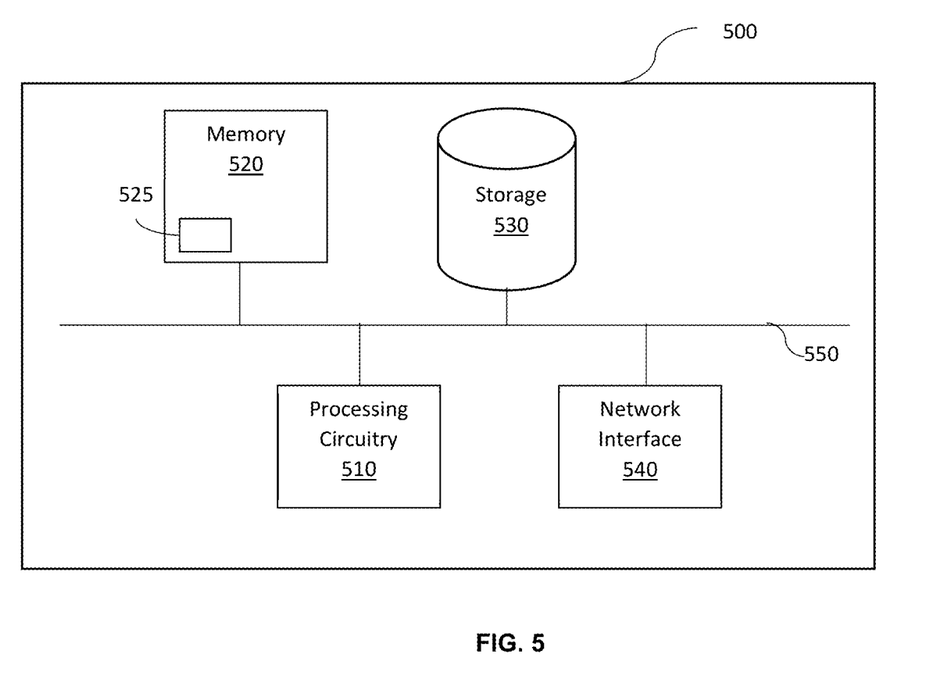
FIG. 5 is a block diagram of a compute device configured to carry out some of the disclosed embodiments.

As shown in the example block diagram in FIG. 5, the client 120 is an electronic device, including a processor and a memory that can be configured to execute script codes, software, HTTP/S pages, and so on.

It should be noted that, although one client 120, one gatekeeper 110, and one protected entity 130 are illustrated in FIG. 1 merely for the sake of simplicity, the embodiments disclosed herein can be applied to a plurality of clients, a plurality of gatekeepers, a plurality of protected entities, or any combination of thereof. The clients may be in different geographical locations.

Figure 2:
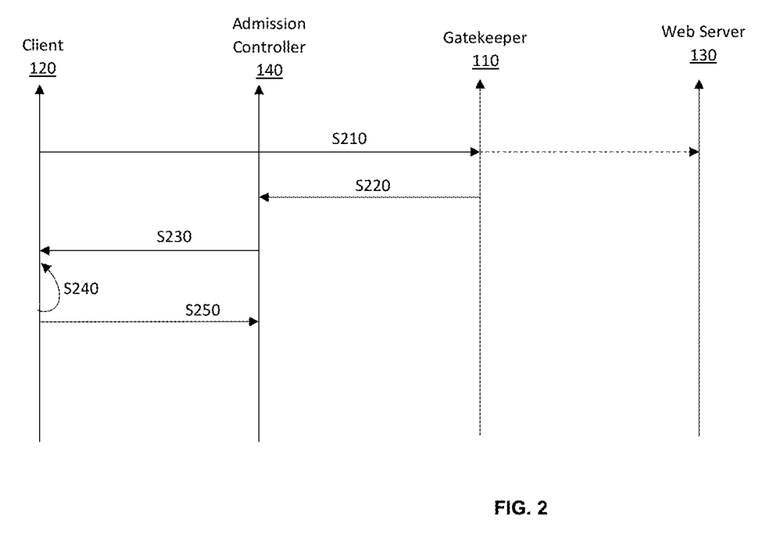
FIG. 2 is a flow sequence diagram illustrating the entity participating in the generation of the identity key according to an embodiment.

FIG. 2 is an example flow sequence diagram 200 illustrating the entity participating in the generation of the identity key according to an embodiment. Illustrated in FIG. 2 are a web server 130, the gatekeeper 110, the client 120, and the admission controller 140. These elements have been discussed in detail above with reference to FIG. 1. Here, the web server 130 is the protected entity.

At S210, a user of the client 120 navigates to a web site hosted by the web server 210. At S220, the request is intercepted to by the gatekeeper 110 and directed to the admission controller 140. At S230, the admission controller 140 returns script code (e.g., Javascript®) to the be executed by a browser of the client 120. The code may be embedded in an HTML page rendered by the browser. The request is directed by the gatekeeper 110 that may identify that this is the first access request made by the client 120.

At S240, the script code when executed in the browsers causes the initiation of an iFrame thread in the browser. In the iFrame, an identity engine is executed and configured to generate the identity key for the client 120. In some configuration, the iFrame may access the admission controller 140 to obtain additional code required for the execution of the identity engine.

The creation of the identity key includes a random number generation that serves as a seed. The seed is saved in a local storage of the iFrame. The information saved in the local storage remains persistent for a number of sessions, i.e., maintained when the browser is closed.

Then, the identity engine in the iFrame further generates a fingerprint of the web browser (125, FIG. 1) and the client 120. The fingerprint may characterize the browser type (e.g., Firefox®, Safari®, etc.), a browser version, any installed browser extensions, a processor type of the client 120, an operating system type of the client, and so on. The generated fingerprint is stored in a session storage of the iFrame. The session storage is similar to a local storage, the only difference is that data stored in session storage is cleared when the page session ends.

The code executed in the iFrame further causes generation of a pair of private and public-encryption keys based on the seed. The encryption keys can be generated using frameworks, such public key infrastructure (PKI), ZkSnarks, and the like typically computed using a mathematical function (e.g., a curve function). The encryption keys include a private key and a public key, where the private key is kept in the iFrame's local storage, while the public key is shared. The public key (public-encryption key) is saved in the local storage of a main thread (window) of the browser. The public-encryption key, in some embodiments, may be signed to ensure the authenticity of the key.

The code executed in the iFrame further causes generation of the identity key using the public-encryption key), fingerprint, and an Internet protocol (IP) address of the client 120. The identity key may be included in a header of requests (e.g., HTTP request) where a single field in the header may include all elements of the identity key or a number of the header's fields.

At S250, the generated identity key is sent to the admission controller 140. As noted above, the controller 240 may open a blockchain-access account for the client, defined as an access policy using the identity key, and generates analytics using the generated key. It should be noted that the identity key allows the maintenance of the user's privacy when accessing the protected entity 130, while providing transparency of admission transactions.

According to the disclosed embodiments, the client 120, attempting to access the web server 210 is required to identify themselves using its identity key. To this end, the identity key may be included in a header section (HTTP request) sent to the server 210. The request is intercepted by the gatekeeper 110 that is being configured to validate the identity key. For example, if any element of the identity key, as designed in the request, does not match the elements of the generate key, the request is blocked.

Figure 3:
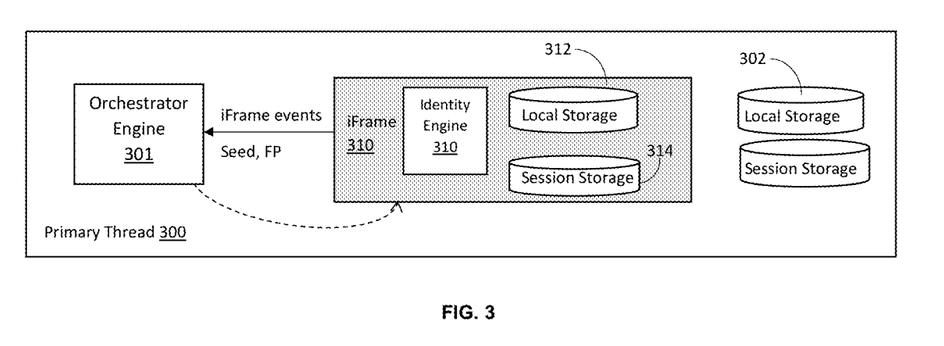
FIG. 3 is a diagram illustrating a schematic browser thread utilized to explain the disclosed embodiments.

FIG. 3 shows an example diagram illustrating a schematic browser thread (window) 300 utilized to explain the disclosed embodiments. The thread 300 is initiated in a web browser when the user navigates to a URL of a protected domain (i.e., a protected entity). The thread 300 runs an iFrame thread (window) 310.

An iFrame is a component of an HTML element that allows to embed documents, videos, and interactive media within a page. This allows for the display of a secondary webpage on your main page. The iFrame element further allows the inclusion of content from other sources, without having to include such content in the web layout's structure, like a traditional HTML element.

The URL of the iFrame 310 is in a domain different than the domain of the protected entity. In an embodiment, the iFrame thread 310 executes an identity engine 312, a local storage 314, and a session storage 316. The identity engine 312 is a piece of script code utilized to generate an identity key, to access the protected domain. The local storage 314 is a property that allows the access of a local storage object. Data in the local storage 314 has no expiration time and is not cleared when the browsing session ends. In an embodiment, the seed is stored in the local storage. The session storage 316 is a property that allows the access of a session storage object. Data in the session storage 316 has an expiration time and is cleared when the browsing session ends. In an embodiment, the generated KPI is stored in the session storage 316.

In an embodiment, the iFrame thread 310, and specifically an identity engine 312 may be called and instantiated by a service worker (not shown). A service worker is script (e.g., JavaScript) file that runs separately from the iframe/main browser window 310 and can intercept network requests, cache, or retrieve resources from the cache, and deliver push messages.

The identity engine 312 interfaces with an orchestrator engine 301, executed in the main thread. The engine 301 may be realized as script code or agent. The orchestrator engine 301 may cause the creation of the iFrame thread. The identity engine 312 provides the orchestra engine 301 with the generated seed to compute the public-encryption key (or simply provide such a key when computed by the engine 312) and the fingerprint. The fingerprint and the seed (or public key) are in the main thread local storage 314.

Figure 4:
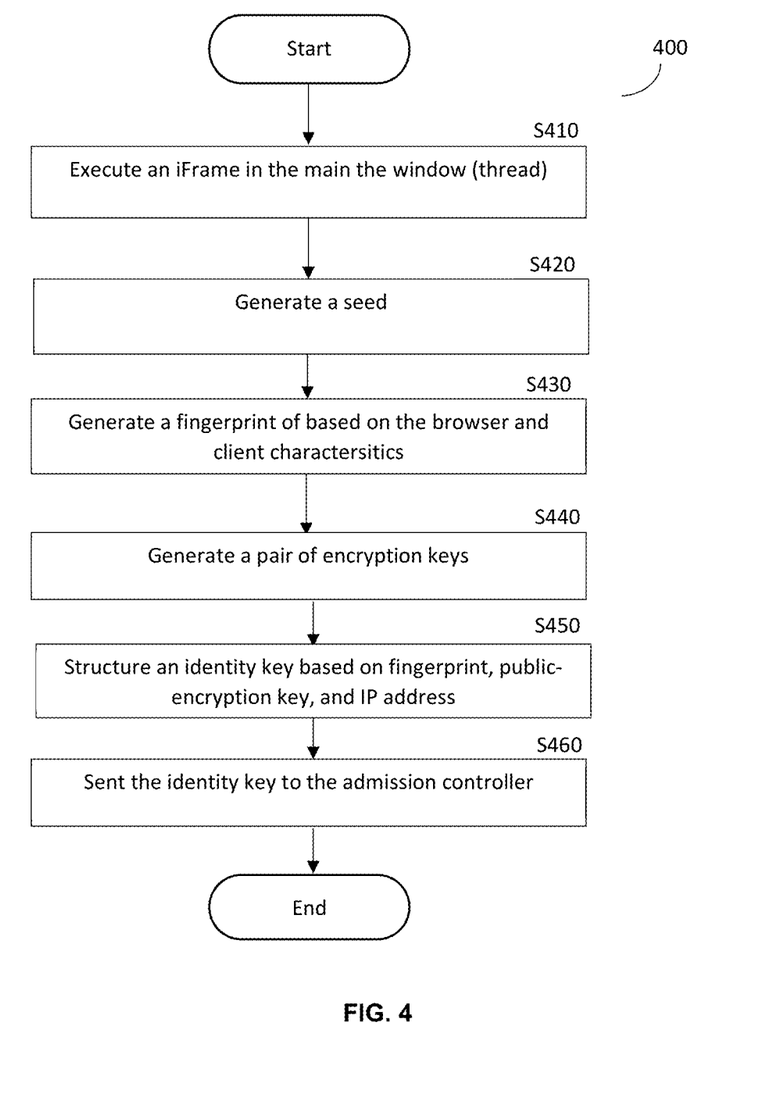
FIG. 4 is an example flowchart for generating an identity key for a protected entity according to an embodiment.

FIG. 4 shows an example flowchart 400 for generating an identity key for a protected entity according to an embodiment. The method is performed by a compute device, such as a client device.

At S410, an iFrame thread is spawned (initiated and executed) in a main browser thread (window). The iFrame thread is spawned by script code (e.g., engine 301) executed in the main thread of a browser. Such script code is retrieved in response to a request to access a protected entity.

At S420, a seed is generated by using a random number generation function. The seed is generated in the iFrame thread and is stored in a local storage of the iFrame frame.

At S430, a fingerprint is generated. The fingerprint is of a web browser (e.g., browser 125) and the device of a client (e.g., the client 120). As noted above, the fingerprint may characterize a browser type, a browser version, installed browser extensions, a processor of the client, an operating system type of the client, and the like, or combination thereof. The generated fingerprint is stored in a session storage of the iFrame frame.

At S440, a public-encryption key is generated using the seed. In an example embodiment, the public-encryption key can be generated using a mathematical function, such as a curve function. The generated public-encryption is saved in a session storage. In an embodiment, the public-encryption key is signed.

At S450, an identity key is assembled to include the public-encryption key, the fingerprint, and an IP address of the client. The identity key may be structured as a single data structure or a collection of its elements. The identity key may include in one or more fields of an HTTP header. In an embodiment, the identity key is signed using the private-encryption key. The created signature is attached to each message sent with the identifier key to validate that the private-encryption key was used.

At S460, the identity key is sent to the admission controller (e.g., controller 140, FIG. 1). As noted above, the admission controller may setup an account and register the client on the blockchain network to allow blockchain-based admission control. Using identity keys, the controller is further configured to define access policies based on the identity keys, and generate baselines based on a collection of identity keys received from other clients.

In an embodiment, the baselines generated by the admission controller 140 may include a number of public-encryption keys per fingerprint, a number of fingerprints per IP address, combinations of fingerprints and public-encryption keys, and so on. It should be noted that the public-encryption key is a public key.

Using the learned baselines, one or more access policies can be determined by the admission controller 140. The access policies may include, for example, deny and request from an IP address that does not have declare a correct combination between a fingerprint and a public-encryption key.

In an embodiment, the gatekeeper (e.g., gatekeeper 110) is provisioned with access policies to enforce such policies when accessing the protected entities.

FIG. 5 is an example block diagram of a hardware architecture 500 of a compute device 500. In embodiment, the client device 120, the admission controller 140 can be realized using the hardware architecture 500.

The hardware architecture 500 includes a processing circuitry 510 coupled to a memory 520, a storage 530, and a network interface 540. In an embodiment, the components of the client device 120 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), GPUs, system-on-a-chip systems (SOCs), general-purpose microprocessors, microcontrollers, digital signal processors (DSPs), and the like, or any other hardware logic components that can perform calculations or other manipulations of information. In an embodiment, the processing circuitry 510 (or the entire system 110) may be implemented as a Turing machine over the blockchain network.

The memory 520 may be volatile (e.g., RAM, etc.), non-volatile (e.g., ROM, flash memory, etc.), or any combination thereof. In one configuration, computer readable instructions needed to implement one or more embodiments disclosed herein may be stored in the storage 530.

In another embodiment, the memory 520 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 510 to perform the various processes described herein. Specifically, the instructions, when executed, cause the processing circuitry 510 to generate identity key(s) by executing the script code as discussed above. In a further embodiment, the memory 520 may further include a memory portion 525 including the instructions.

The storage 530 may be magnetic storage, optical storage, and the like, and may be realized, for example, as flash memory or other memory technology, CD-ROM, Digital Versatile Disks (DVDs), hard-drives, SSD, or any other medium which can be used to store the desired information, such as, log of transactions, public keys, and so on. The storage 530 may include the various access policies and games.

The network interface 540 allows the client device 120 to communicate with the blockchain network, the Internet, or a local area network. The network interface 540 furthers peer-to-peer communication with these elements.

It should be understood that the embodiments described herein are not limited to the specific architecture illustrated in FIG. 5, and that other architectures may be equally used without departing from the scope of the disclosed embodiments.

It should be further noted that the client device 120, the admission controller 140 and/or the gatekeeper 110 may be realized using a computing architecture similar to the architecture illustrated in FIG. 5, but that other architectures may be equally used without departing from the scope of the disclosed embodiments. Further, the memory 520 may include instructions for executing the function of the respective device, e.g., a client device 120, a gatekeeper 110, or the admission controller 140.

The various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identity-based access admission, comprising:
   generating in a browser of a client device a unique identity key for the browser, wherein the identity key is generated in an internal frame (iFrame) thread, is executed in a main thread of the browser, and wherein the identity key includes a fingerprint characterizing in part the browser and the client device, an internet protocol address of the client device, and a public-encryption key; and
   registering the identity key with an admission controller, wherein access to a protected entity by the client device is enforced using the identity key.

2. The method of claim 1, wherein generating the identity key further comprises:
   generating a seed using a random number function;
   computing a pair of private-encryption and private-encryption PKI keys using the random number function;
   saving the seed and the private-encryption key in a local storage of the iFrame thread, wherein the local storage is a persistent storage; and
   saving the public-encryption key in a local storage of the main thread.

3. The method of claim 2, further comprising:
   generating the fingerprint based on a plurality of properties of the browser and client device; and
   saving the fingerprint in a session storage of the iFrame thread.

4. The method of claim 1, further comprising:
   spawning the iFrame thread from the main thread by executing script code in the main thread, wherein the script code is retrieved from the admission controller in response to a request to access the protected entity by the client.

5. The method of claim 1, further comprising:
   including the identity key in header requests sent to the protected entity.

6. The method of claim 1, wherein registering the identity key with the admission controller further comprises:
   providing blockchain-based access authorization to the protected entity, wherein the identity key identifies the client device on a blockchain network.

7. The method of claim 6, wherein the blockchain-based access authorization is based on any one of: bias-based admission and access tokens-based admission.

8. The method of claim 1, further comprising:
   collecting identity keys from a plurality of client devices;
   analyzing the identity keys to generate at least one baseline; and
   defining at least one access policy based on the at least one baseline.

9. The method of claim 8, further comprising:
   enforcing access to the protected entity based on the at least one access policy.

10. A non-transitory computer readable medium having stored thereon instructions for causing a processing circuitry to execute a process for method for identity-based access admission, the process comprising:

generating in a browser of a client device a unique identity key for the browser, wherein the identity key is generated in an internal frame (iFrame) thread, is executed in a main thread of the browser, and wherein the identity key includes a fingerprint characterizing in part the browser and the client device, an internet protocol address of the client device, and a public-encryption key; and registering the identity key with an admission controller, wherein access to a protected entity by the client device is enforced using the identity key.

11. A system for identity-base access admission, comprising:
a processing circuitry; and
a memory, the memory containing instructions that, when executed by the processing circuitry, configure the system to:
generate in a browser of a client device a unique identity key for the browser, wherein the identity key is generated in an internal frame (iFrame) thread, is executed in a main thread of the browser, and wherein the identity key includes a fingerprint characterizing in part the browser and the client device, an internet protocol address of the client device, and a public-encryption key; and
register the identity key with an admission controller, wherein access to a protected entity by the client device is enforced using the identity key.

12. The system of claim 11, wherein the system is further configured to:
generate a seed using a random number function;
compute a pair of private-encryption and private-encryption PKI keys using the random number function;
save the seed and the private-encryption key in a local storage of the iFrame thread, wherein the local storage is a persistent storage; and
save the public-encryption key in a local storage of the main thread.

13. The system of claim 12, wherein the system is further configured to:
generate the fingerprint based on a plurality of properties of the browser and client device; and
save the fingerprint in a session storage of the iFrame thread.

14. The system of claim 11, wherein the system is further configured to:
spawn the iFrame thread from the main thread by executing script code in the main thread, wherein the script code is retrieved from the admission controller in response to a request to access the protected entity by the client.

15. The system of claim 12, wherein the system is further configured to:
include the identity key in header requests sent to the protected entity.

16. The system of claim 12, wherein the system is further configured to:
provide a blockchain-based access authorization to the protected entity, wherein the identity key identifies the client device on a blockchain network.

17. The system of claim 16, wherein the blockchain-based access authorization is based on any one of: bias-based admission and access tokens-based admission.

18. The system of claim 11, wherein the system is further configured to:
collect identity keys from a plurality of client devices;
analyze the identity keys to generate at least one baseline; and
define at least one access policy based on the at least one baseline.

19. The system of claim 18, wherein the system is further configured to:
enforce access to the protected entity based on the at least one access policy.

* * * * *